(12) United States Patent
Haaramo et al.

(10) Patent No.: US 7,046,993 B2
(45) Date of Patent: May 16, 2006

(54) GROUP COMMUNICATION DEVICE AND METHOD

(75) Inventors: Ville Haaramo, Espoo (FI); Turkka Keinonen, Huhmari (FI); Panu Korhonen, Helsinki (FI); Harri Wikberg, Helsinki (FI); Johanna Fräki, Helsinki (FI); Raimo Bäckström, Espoo (FI); Jyri Rauhala, Tampere (FI); Tatu Tahkokallio, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/853,214

(22) Filed: May 26, 2004

(65) Prior Publication Data

US 2004/0219941 A1  Nov. 4, 2004

Related U.S. Application Data

(63) Continuation of application No. 09/442,466, filed on Nov. 18, 1999, now Pat. No. 6,757,531.

(51) Int. Cl.
*H04M 3/42* (2006.01)

(52) U.S. Cl. .................. 455/414.4; 340/7.1
(58) Field of Classification Search ............. 455/414.1; 340/7.1, 256, 235
See application file for complete search history.

(56) References Cited

U.S. PATENT DOCUMENTS

| 4,567,590 | A | * | 1/1986 | Bederman | ................ 370/452 |
|---|---|---|---|---|---|
| 4,581,486 | A | | 4/1986 | Matthews et al. | |
| 5,423,061 | A | * | 6/1995 | Fumarolo et al. | ........... 455/519 |
| 5,463,546 | A | | 10/1995 | Parkhurst | |
| 5,495,357 | A | | 2/1996 | Osterhout | |
| 5,497,100 | A | | 3/1996 | Reiser et al. | |
| 5,577,032 | A | | 11/1996 | Sone et al. | |
| 5,764,747 | A | | 6/1998 | Yue et al. | |
| 5,832,229 | A | * | 11/1998 | Tomoda et al. | ............. 709/227 |
| 6,014,429 | A | * | 1/2000 | LaPorta et al. | .......... 379/88.15 |
| 6,014,569 | A | * | 1/2000 | Bottum | ...................... 455/466 |

(Continued)

FOREIGN PATENT DOCUMENTS

EP 0535601 4/1993

(Continued)

*Primary Examiner*—Fan Tsang
*Assistant Examiner*—Ming Chow
(74) *Attorney, Agent, or Firm*—Banner & Witcoff, Ltd.

(57) ABSTRACT

A method for voice based communication between a number of mobile terminals of a telecommunication network, the method comprising the steps of creating a group of said number of terminals and storing group information in each of the number of terminals, recording a voice message in one of the terminals of the group, dispatching the voice message to the terminals of the group from the one of the terminals, and receiving the voice message at at least all other terminals of the group. The step of creating a group of terminals further comprises the steps of coupling together a number of mobile terminals, initiating a group creation command from at least one of the terminals, sending predetermined information from terminal to terminal to each terminal of the number of terminals for forming a group information, and transmitting the group information to all of the terminals thus forming a group of the terminals.

10 Claims, 10 Drawing Sheets

U.S. PATENT DOCUMENTS

| | | |
|---|---|---|
| 6,073,103 A | 6/2000 | Dunn et al. |
| 6,081,815 A * | 6/2000 | Spitznagel et al. ...... 715/501.1 |
| 6,128,381 A | 10/2000 | Holmstrom et al. |
| 6,185,433 B1 | 2/2001 | Lele et al. |
| 6,195,751 B1 | 2/2001 | Caronni et al. |
| 6,223,286 B1 | 4/2001 | Hashimoto |
| 6,230,007 B1 | 5/2001 | Archambeault |
| 6,288,739 B1 | 9/2001 | Hales et al. |
| 6,396,814 B1 * | 5/2002 | Iwamura et al. ............ 370/256 |
| 6,563,619 B1 * | 5/2003 | Hirayama et al. .......... 398/121 |
| 6,728,553 B1 * | 4/2004 | Lehmus et al. ............. 455/558 |

FOREIGN PATENT DOCUMENTS

| | | |
|---|---|---|
| EP | 0959401 | 11/1999 |
| WO | 9423525 | 10/1994 |
| WO | WO 9621984 | 7/1996 |
| WO | WO 9702561 | 1/1997 |

* cited by examiner

GROUP COMMUNICATION DEVICE AND METHOD

This application is a continuation of U.S. Patent Application Ser. No. 09/442,466, filed Nov. 18, 1999, now U.S. Pat. No. 6,757,531 which is incorporated by reference herein in its entirety.

TECHNICAL FIELD OF THE INVENTION

The invention relates to a group communication method and a device, a method for forming of a group of terminal devices and a method for listening a message between members of an established group and a method for sending a message between members of an established group.

DESCRIPTION OF RELATED ART

Advances in telecommunications systems technology have resulted in a variety of systems and services being available for system users. These systems include cellular telephone systems providing mobile telephone services. The cellular telephone systems provide services that allow subscribers to these systems to increase their accessibility and be reachable, potentially at all times, and as long as the subscribers remain in the service areas covered by their systems.

In a cellular system, a person desiring to contact the cellular subscriber would simply dial the phone number of the cellular subscriber to contact the subscriber at the subscribers cellular telephone. As long as the cellular subscriber kept the cellular telephone powered on the subscriber would be accessible when located within the coverage area of the cellular system.

Normally the system sets up a call between the cellular telephone or a so-called mobile terminal and another mobile terminal or a subscriber of a public switched telephone network PSTN. Dialing the subscriber number of the mobile terminal or the like sets up a call to the given mobile terminal. In group calls the whole group is called with a single dialed number, i.e. a group number. A group call is a conference call in which all participants may talk in turn and hear one another. An individual mobile radio may belong to a plurality of groups programmed into the mobile radio. The system keeps a file on the base stations associated with the group number of each group. A group call may cover one, several or all base stations within the area of a mobile exchange or a plurality of mobile exchanges.

Some mobile networks include short message services, e.g. SMS is a bi-directional service in GSM for short alphanumeric messages or data in similar form. In SMS it is possible to deliver a message to the mobile terminal even during an established call, or to deliver a message using so-called store-and-forward service, in which the message is stored in the network, if the mobile terminal is unavailable, and forwarded shortly after the mobile terminal can be reached again. In the traditional GSM system dataservices are based on circuit switched technology providing maximum data transfer rate of 9.6 kbit/s for transparent and non-transparent bearer services for data communication. Along with an increasing data volume, demand for higher transfer rates has arisen so that the GSM has been developed to include as an extension the so-called General Packet Radio service (GPRS) as a packet switched data service.

Current solutions use names (e-mail) or telephone numbers (phones) to identify receivers which the user or an administrator must input to the system.

SUMMARY OF THE INVENTION

One drawback of using a cellular system to remain accessible overtime is that cellular airtime charges maybe expensive, even for calls made from a second party to the cellular telephone. Especially in a family with many mobile phones the costs will raise quite high. Also the calls between the young people will go high, as they usually want to keep contact quite often and continuously with friends. This same applies to the people who wish to communicate with the people who are close regarding work, hobbies, and school and want only to communicate with certain team members. Also the need for a simple communication with simple terminals exists in order to establish communication between group members. Also to define a group, i.e. to define which members can communicate with each other has been quite difficult especially after one has bought his/her phone. Especially for children there is a real need for cheap terminals in order to avoid harms after the terminal is possibly lost or it has been broken due to the fall of the phone. There is also a great need for communication between people, in a way not to overload the network, and, however, so that the subscribers can be reached easily and reliably. Further the younger people who are members of teams or other groups want to have a common communication terminal and communication way for their group.

The present invention introduces a new method and terminal, preferably a wireless communication terminal, for sending voice messages to a group of terminals as one single transmission from the sending terminal. Preferably a cellular telephone network is used for the wireless communication. Also the present invention provides a method for creating a group of terminals by coupling together providing a number of mobile terminals and initiating a group creation command to pass each of the coupled terminals in order to form a group information. The coupling may be a wireless or physical coupling, and the group information is preferably sent to a server connected to the network which stores and updates the group information and after group establishment passes messages to the terminals of the group.

According to a preferred embodiment of the terminal according to the invention accessibility is aimed at by a simple user interface design, an approachable simple appearance, a wearable lightweight, small and robust body. The method is a voice messaging delivery system that enables service providers to offer portable two-way communication services over cellular networks. It is possible to use the mobile phone also as to group mode by selecting a predetermined key for the communication within the group. One-key selection makes it easy to contact the other group members. The invention makes possible communication between terminals, which have a non-conventional keypad, or between the terminals which have keypad or display and the terminals, which have neither display nor keypad for number dialing. The terminal does not need to know the actual members of a particular group. As result the terminal can be designed to be easy to use and cheap to produce. It is usable for remote working teams (e.g. field engineering, fishing, agriculture), and e.g. for elderly people's security.

Further the invention is assumed to be suitable especially for young children who have a relatively limited number of reference groups.

According to a first aspect of the invention there is provided a method for voice based communication between a number of mobile terminals of a telecommunication network, said method comprising the steps of, creating a group of said number of terminals and storing group information in each of said number of terminals, recording a voice message in one of said terminals of said group, dispatching the voice message to said terminals of said group from said one of said terminals, and receiving the voice message at at least all other terminals of said group.

According to a second aspect of the invention there is provided a method for establishing a group of mobile terminals said method comprising the steps of:

coupling together a number of mobile terminals, initiating a group creation command from at least one of said terminals, sending predetermined information from terminal to terminal to each terminal of said number of terminals for forming a group information, transmitting the group information to all of said terminals thus forming a group of said terminals.

According to a third aspect of the invention there is provided a method for sending a message from a mobile terminal to a group of mobile terminals of a telecommunication network, said method comprising the steps of selecting at the mobile terminal the group of a number of predetermined groups, allowing the user of the mobile terminal to speak a message, transmitting the recorded message to a server, storing at the server information on the terminals of the group of terminals, and further transmitting the message to each terminal of said group of terminals from the server based on said information.

According to a fourth aspect of the invention there is provided a method for receiving a message at a mobile terminal of a telecommunication, said method comprising the steps of receiving a voice message comprising a recorded message, indicating to the user of the terminal that a message has been received, further indicating to the user of the terminal that the received message is from a terminal belonging to a certain group of a number of predetermined groups, allowing the user to give an input to the terminal, and upon receiving said input playing back the received recorded voice message at the terminal.

According to a fifth aspect of the invention there is provided a wireless voice communication terminal for a radio communication network, said terminal comprising a recorder for recording a voice message, means for storing a terminal communication group definition defining a number of terminals belonging to the same communication group, and means for sending said recorded voice message to said number of terminals of said communication group as single transmission from the wireless voice communication terminal.

DETAILED DESCRIPTION

Figure 1:
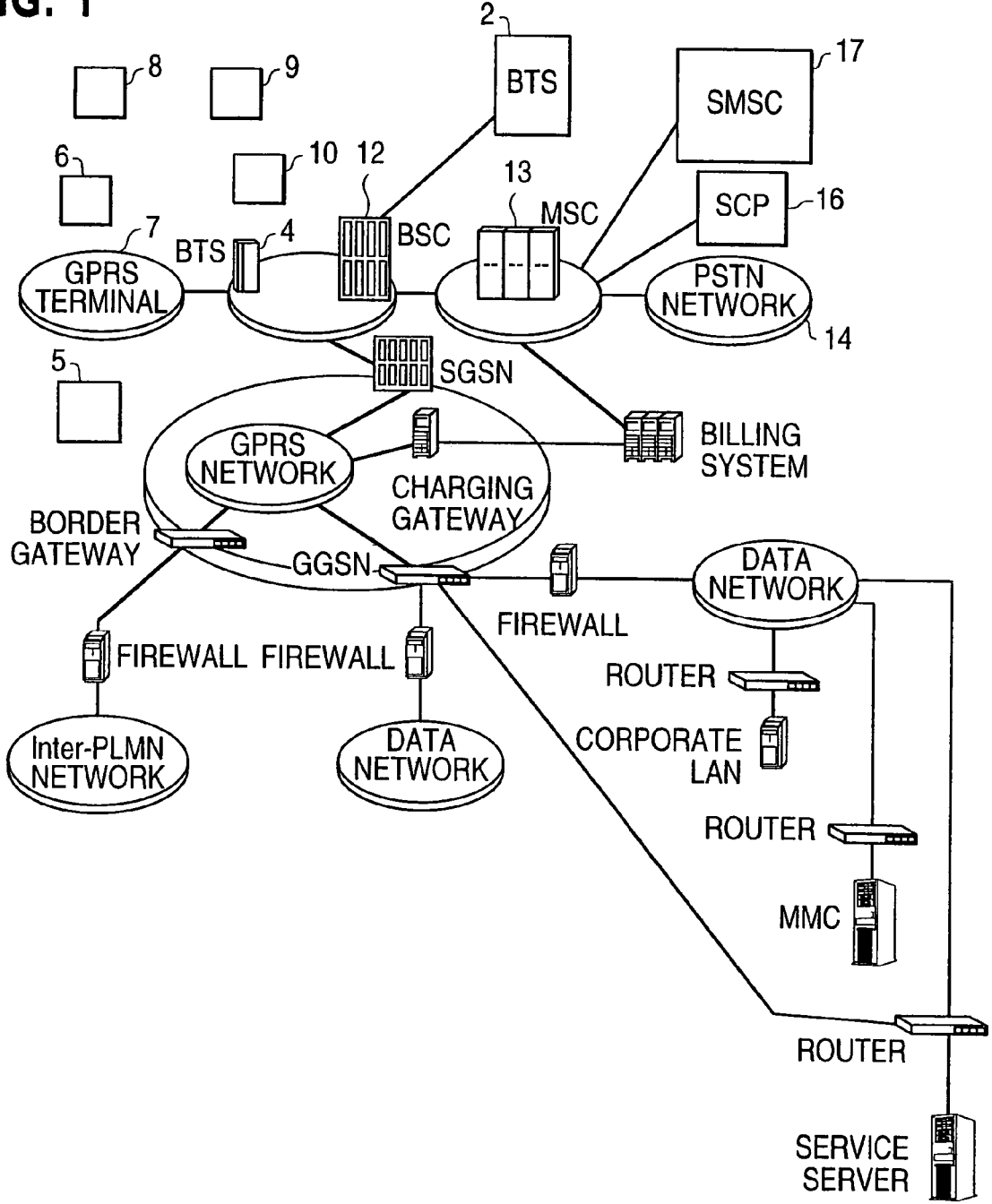
FIG. 1 illustrates a block diagram of a communications network.

FIG. 1 shows both a circuit and switched telecommunications network. The network comprises a number of base stations (BTSs) 2, 4 etc. Each base station has a radio transceiver capable of transmitting radio signals to and receiving radio signals from the area of an associated cell. By means of these signals the base station can communicate with the mobile terminal 5, 6 in the associated cell, e.g. Nokia 2110. The terminals 7, 8, 9, 10 represent terminals according to the present invention and will be discussed in more detail later in this description. Each terminal includes a radio transceiver, respectively. Each base station 2, 4 is connected via a base station controller (BSC) 11, 12 to mobile switching center (MSC) 13 which is linked in turn to the public telephone network (PSTN) 14 to other mobile switching centers (not shown). The MSC is linked to service controlling point SCP 16 in order to reach the Intelligent network services. A short message service center (SMSC) 17 for providing short message services may be connected to the MSC. All the terminals are preferably identified by a phone number or similar address information, which are maintained in HLR home location register that is stored separately in the network. VLR (Visitor Location Register) has the information of the user when the user is outside its own HLR area. The HLR, which may contain in the MSC subscriber information, is enhanced with GPRS subscriber information. The HLR contains e.g. the following information IMSI, which is the identifier of the mobile phone, and MSISDN, which is the basic MSISDN of the MS. The user information may include information that the mobile has the voice message communication service or the SMS service. By means of this system a user of the mobile terminal can establish a telephone call or corresponding connection to a destination which can be a subscriber in the PSTN or another mobile terminal in a mobile network or even a terminal in a computer network. The group communication voice calls can be realized using e.g. server connected to the network and keeping record of the groups. Then the user having a mobile terminal dials the number for that service or sends a short message from his/her mobile telephone. The exchange recognizes that the number dialed that the identifier of the message terminal is a trigger to IN services and the calls are routed to the intelligent network's database or register. The numbers like 0800 and the like are usually routed to the IN. The functionality of exchange (e.g. MSC) will be called service-switching point. Then in the intelligent network there is a register, which has the information of the group concerned in order to deliver the message to the recipients of the group.

The FIG. 1 further illustrates network elements of the GPRS network structure. The GPRS network is described in detail in ETSI standard GSM 03.60 V6.2.0. In GPRS a packet-mode technique is used for transferring data and signaling. GPRS's interworking is defined with IP networks and X.25 networks. SMS can be sent over GPRS radio channels. In the network the Service GPRS Support Node (SGSN) is keeping track of the mobile terminals' location. The SGSN is connected to the base station system. The Gateway GSN (GGSN) is interworking packet-switched networks like company intranets and datanetworks. GGSN is connected with SGSNs via an IP-based GPRS-backbone network. It will be understood that even if it is described as a way of an example GSM and GPRS, the network can be CDMA, W-CDMA, PHS, EDGE, UMTS etc.

Figure 2:
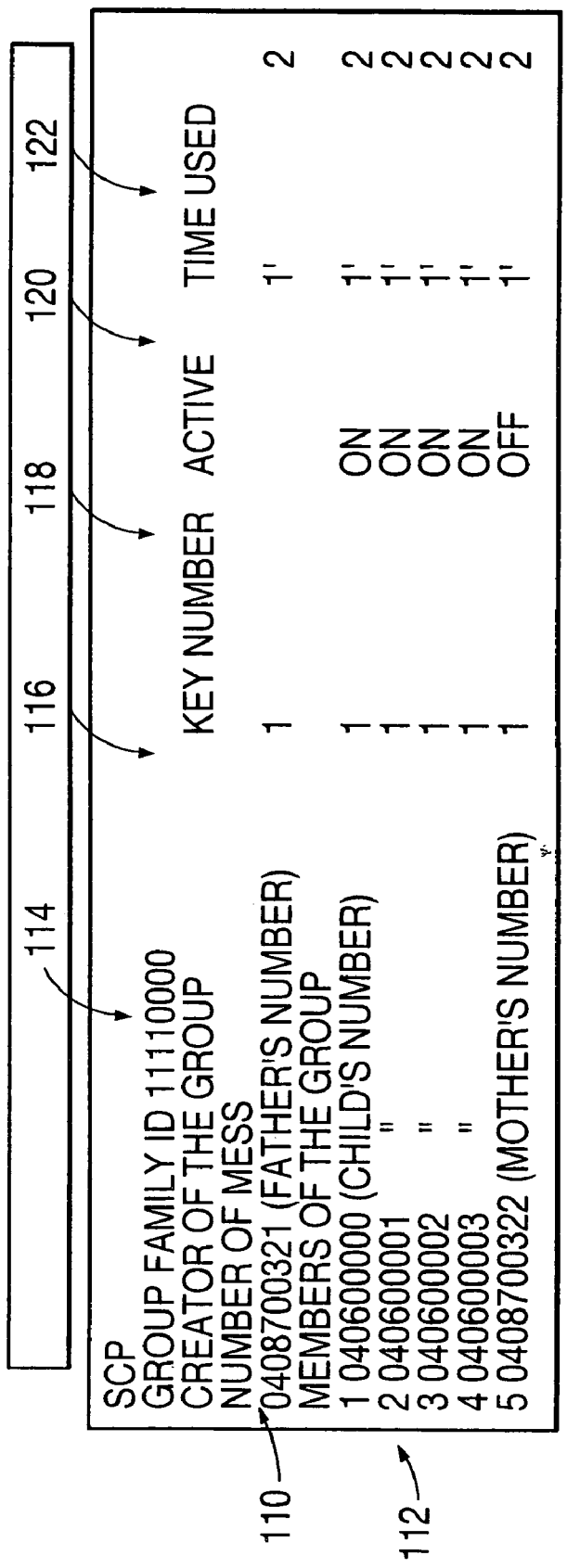
FIG. 2 illustrates a schematic diagram of an example of the information of one group.

FIG. 2 illustrates a schematic diagram of the information that one communication group will have in a register. The information may be located in a service control point (SCP), which is connected to the MSC as shown in FIG. 1. A key to the information in the one group's information is a group identifier (id) 114, which may be provided by the communication server in the network. The one who has sent group information to the communication server may be identified in the communication server, e.g. usually by the telephone number of the mobile terminal e.g. 0408700321 which can be e.g. father's number 110. The group may be called as a family group. The register will comprise the key number of the mobile phone 116, which means the key through which the calling can occur between the group members. The field showing activity of the group member 118 is usually on or off depending on whether the member is reachable or not. Further the used time of the service of a group member can be followed and statement e.g. minutes and seconds used can be presented in the field 120. It is also possible to collect the number of the connections the group members have been had. This will be shown in the number of messages sent field 122. The phone numbers 112 will identify all members of group. The number of the group member is shown in field 108. As only one example is shown it will be understood that the group does not need to have a separate creator but the group has been created by collegially.

Figure 3:
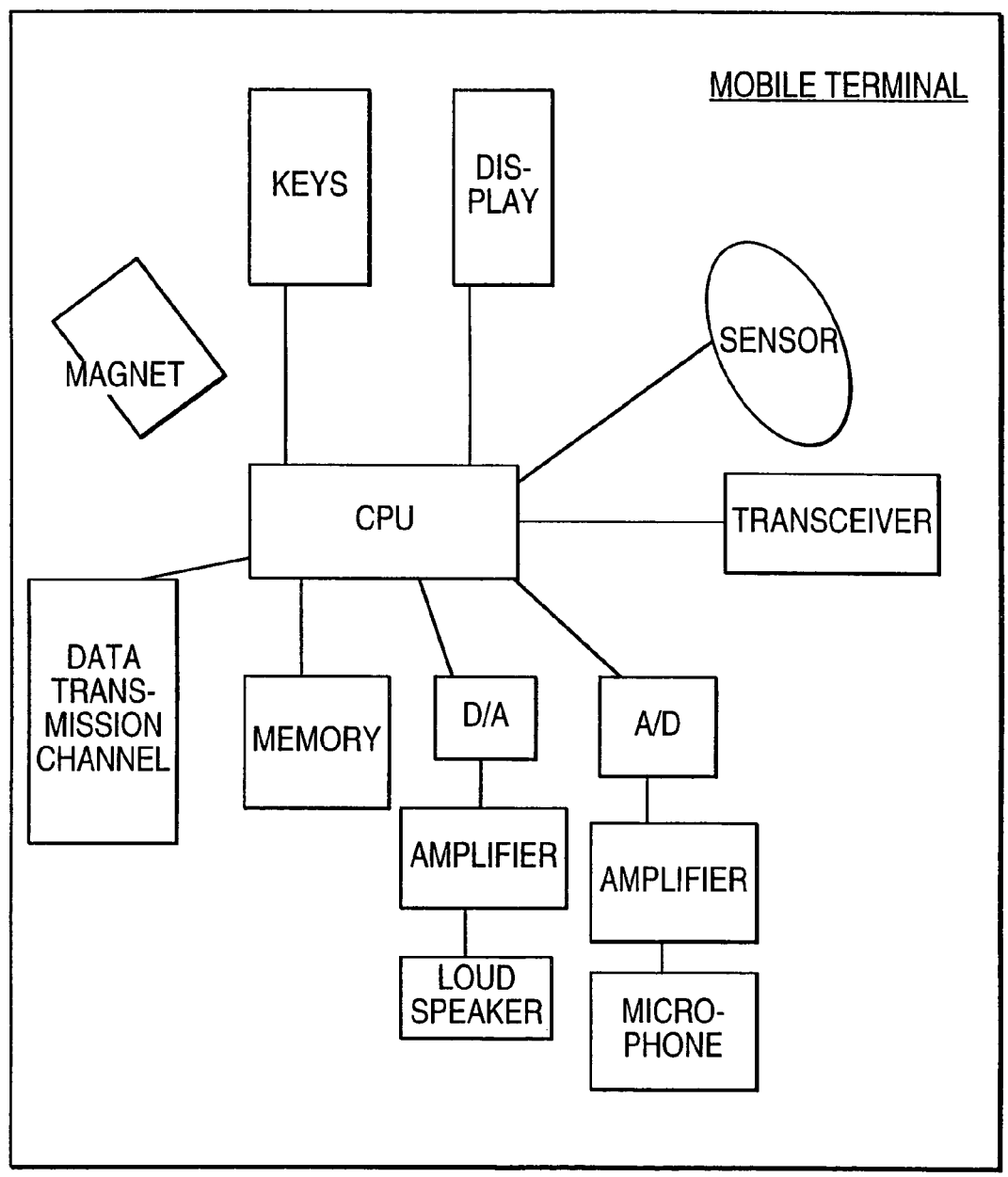
FIG. 3 illustrates a block diagram of relevant portions of a terminal according to the invention.

The table can further include instead of mobile number the address of the terminal consisting of the IP (Internet protocol) address or MSISDN number combined with the information of the name of the group and/or the names of the group members. The table may be located also in a communication server in the IP network in a service server as in FIG. 1, or e.g. in a so called multimedia messaging service center (MMSC) of Nokia. The service may be reached from the GGSN through Firewall or without Firewall. Then the functionalities will be group forming and store and forward capabilities. Referring now to FIG. 3 therein is a block diagram showing for the invention relevant portions of a mobile terminal. The structure of a GSM phone is presented in more detail e.g. in international application WO97/02561. A mobile terminal comprises keys (a keypad), display, memory, microphone, speaker, necessary amplifiers and A/D and D/A converters, demodulator, modulator, receiver, transmitter, antenna, and controller or CPU for controlling the various functions. Further a mobile terminal typically comprises battery pack, (which are not shown) keys for receiving and sending messages, means, like illuminating light, for informing a message received. A terminal according to the present invention uses its memory for storing an incoming voice message, and uses its keypad for recalling the incoming voice message from the memory. Preferably the mobile terminal according to the invention may comprise one dedicated illuminated button for each communication group, and a recorder for recording a message. Further the display is included to support the menu functions to be used in connection with the use of the terminal. The terminal preferably may have compressing means for compressing the recorded message and adapting means including a packetising means for packetising the compressed voice mail message in the terminal into data packets for packet-switched transmission as is described e.g. in the international application WO9621984, or as known from Nokia 9110 Communicator device. The compressed message is then delivered to the ISDN address or IP address via a public data network, the GPRS or GSM. The controller (CPU) provides signals to transmitter and receives signals from receiver. The signals may include control signals or voice/data communications between MS and cellular system.

Figure 8:
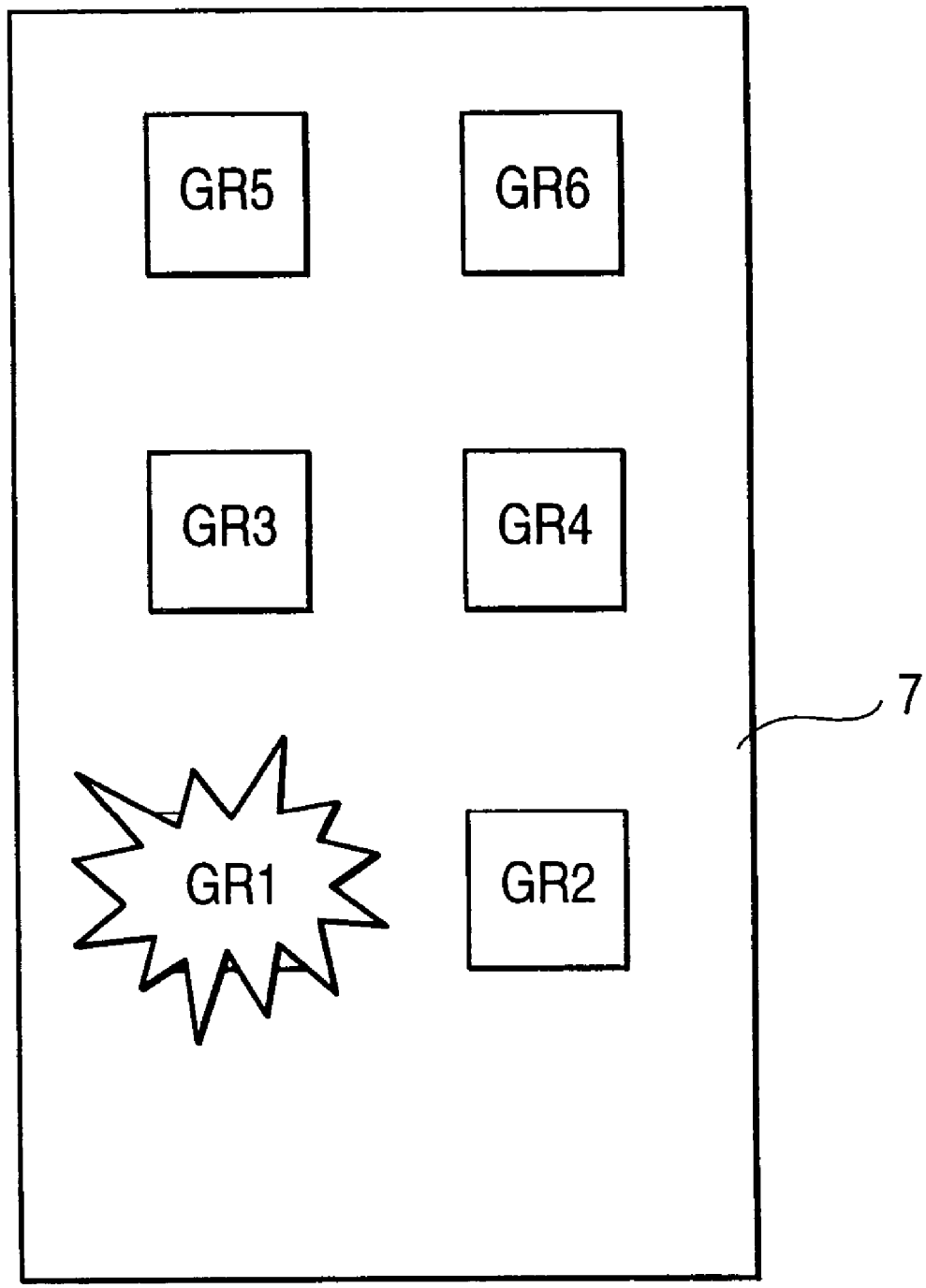
FIG. 8 shows an embodiment of the terminal of the invention schematically.

For one communication group there is only one button or key if the terminal is constructed by hardware as is shown in FIG. 8. There are six different group buttons from GR1 to GR6. All interactions to the specific group in that case are controlled with the one button. There may be one dedicated illuminated button for each communication group, whereby the button can be lighted to illustrate that a message has been received from a terminal of that particular group. With one button the user can form a group, send a voice message to a group, and listen to a message from a member of a group. When GR1 is illuminating as in FIG. 1, it means that the group has been formed or a voice message is waiting for playing. The mobile terminal is in one embodiment arranged so that the group specific keys will illuminate when the user gets a message from a terminal of that group. The group specific button of the keypad will illuminate in order to inform the user that a message has been received. The mobile terminal may then have e.g. a separate mode for group communication and usual dialing of numbers. A received message is stored and waiting in the voice mail in-box. The terminals according to the invention according to the invention may be a conventional mobile phone for normal voice or data communication but equipped with the voice messaging feature or it may be a special voice messaging terminal with less keys and functionalities so that they can easily be used e.g. by the children.

Further FIG. 3 shows that the messaging terminal has a data transmission channel as for which it is possible to use a serial bus (RS-232), a parallel bus (Centronics, an infrared interface or a low power RE interface (LPRF) like so called Bluetooth. Alternatively the messaging terminal can have a magnet and a sensor for detecting the presence of the terminal as will be discussed later.

One group member can be a member of many different groups. The mobile phone will have many group ids. Therefore in order to control the memberships of one mobile terminal or the user in the service, a database in the communication server for the single user can be created. It is, however, limited usually to the 5 to 10 groups per member in order to keep the system simple. However, the database of the communication server can also collect information of the memberships of the users. Then all information regarding the user number may be collected to the communication server. A further possibility is that the communication server will have e.g. a column information about each messaging terminal's key 116 in connection with the user in FIG. 2. Then the messaging terminals may call e.g. by key No.1 to the group members identified by that number in the register, respectively. The id of the group transmitted will then inform the communication server located in SCP or in IP network, which group is concerned.

The creation of the groups will be presented in the following. Two different kinds of groups can be made: between simple voice messaging terminals a group can be established. One or several voice messaging terminals or conventional mobile phones can establish a group. One can buy one, two (or several) terminals or permissions to provide a group from a supermarket or kiosk, form a group or the group is already created beforehand for those terminals and start using the terminals in group communication immediately. The terminal price may include a defined amount of prepaid communication capacity or it can be paid afterwards in the subscriber invoice. If one of the group members is already a subscriber of the telecommunications network, he can be billed using this voice messaging service as he has used his telephone. This bill can include all the group messaging services used especially when a family group is concerned. If the voice messaging terminals for group members have been bought and a prepaid amount of usage time is used, then the user can buy more time in order to further use the voice messaging terminal. One needs to make a contract with the operator not until the prepaid capacity is used.

In following the actual physical creation of a group will be explained. In a preferred embodiment creating a group is done by actually getting all terminals (which are to become members of the group) together in one single location and then upon joint decision starting the necessary actions for creating a messaging group maintaining the group feeling even when scattered around. When a group of terminals is within, say, one room, the inter-terminal communication needed for grouping can be arranged based on: short distance wireless (e.g. infrared or radio) or physical contact (galvanic contacts) or contactless based on inductive, capacitive or optical coupling.

Figure 4:
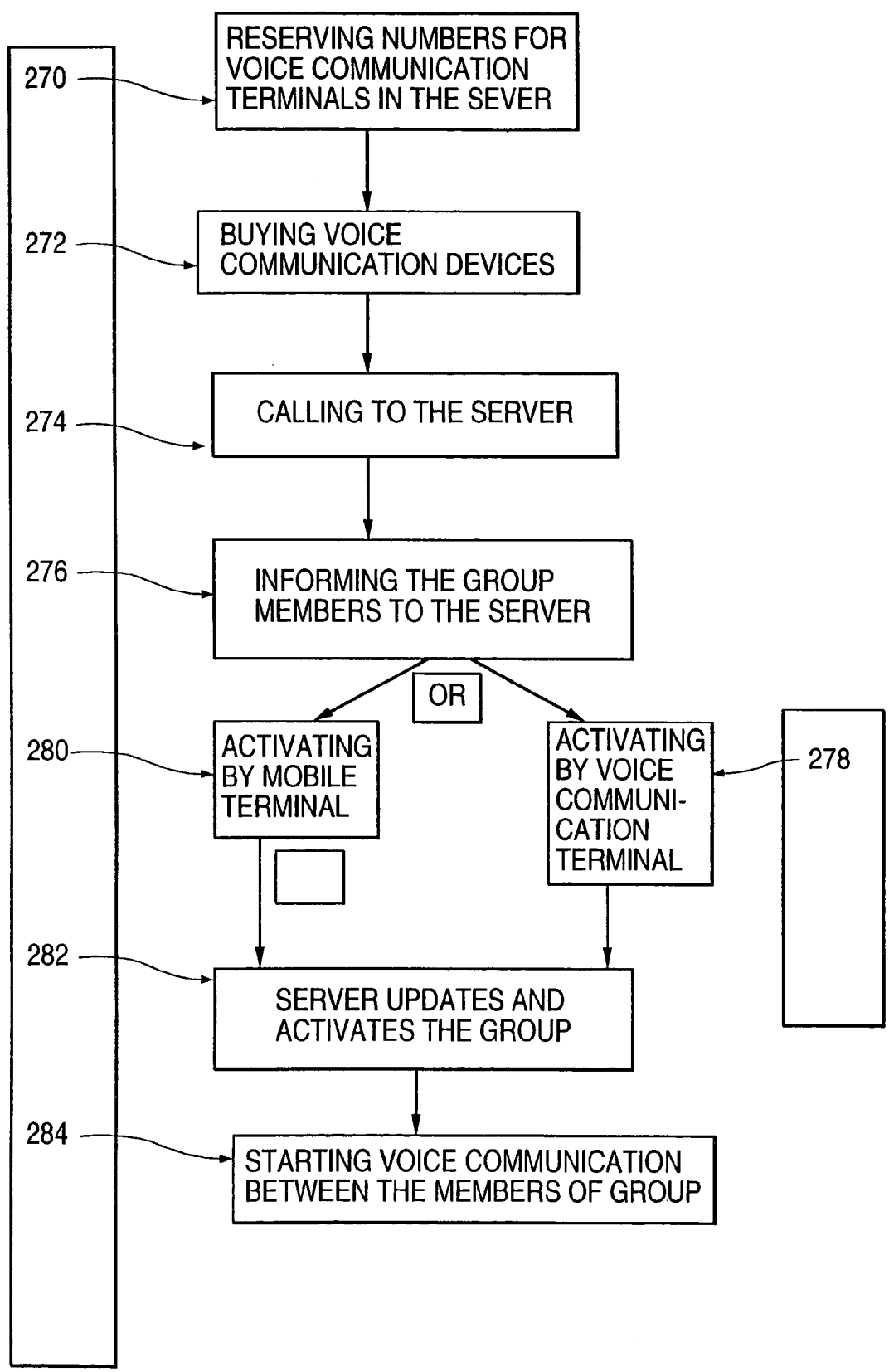
FIG. 4 illustrates a flow diagram of the creation of a group.

In FIG. 4 the main steps for forming a group are illustrated by first reserving numbers for voice messaging devices in the communication server in step 270, selling and buying voice messaging terminals in step 272, calling the communication server by at least one of those terminals in step 274 and informing the group and terminal information to the communication server in 276, which may be sent to the server either by mobile terminal of conventional type in step 280 or by voice messaging terminal in step 278. The communication server activates the group of the terminals in step 282. Next the terminals can start to communicate with each other between the predetermined group members in step 284.

Figure 5:
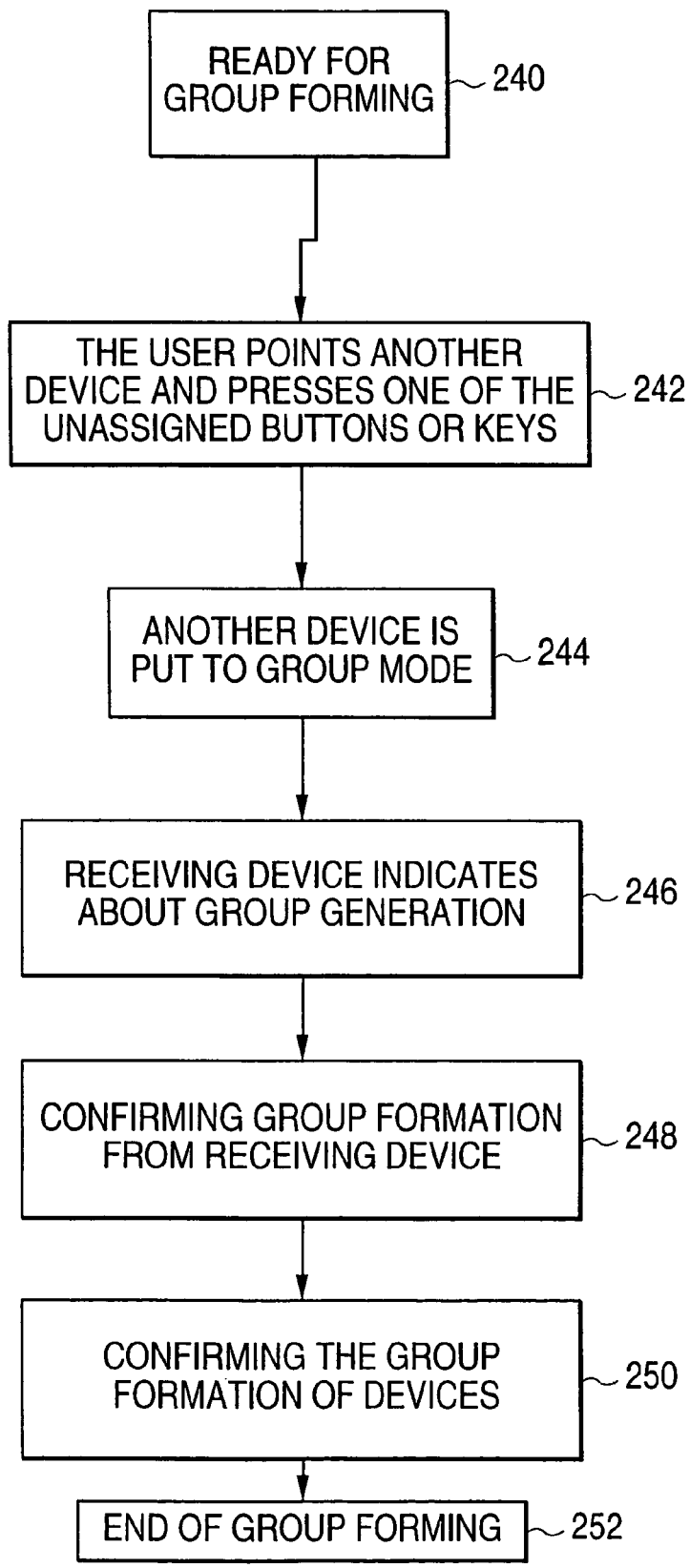
FIG. 5 illustrates a flow diagram of a further possibility to form a group.

FIG. 5 illustrates a block diagram showing how to connect the terminals together in order to create a group. Opening IR port cover in stage 240, physically pushing two IR ports against each other enters group mode or any similar physical manipulation related to the IR ports. The user points another terminal and presses one of the unassigned buttons or keys in stage 242. Then the information is transferred between the terminals so that the information in the transmission between two terminals includes e.g. the ISDN number, key number, and information that a group is to be founded. The information from the last group member will collect all information from the previous members and send the information to the communication server which then gives to the group an identifier and sends that identifier to the terminals in the group. The receiving terminal is also put to group mode in stage 244. The receiving terminal indicates that it has been invited to a group by a sound signal and an LED blinking sequence in stage 246. The receiver confirms the group formation by pressing one of the unassigned buttons during a timeout (app. 5 s) in stage 248. The group formation between the two terminals is confirmed by a sound signal and the previously dark LEDs start to shine in stage 250. After a while (app. 30 sec.) the shining LEDs turn dark unless group mode is exited before that in stage 252. A specific group mode is not necessary here, as new groups can only be assigned to previously unassigned buttons. However, the mode would be necessary for confirmation and for providing information on group status. Due to the newly created group the LEDs shine of the terminal is activated, one is able to send the link to the third (or the nth, n=integer) terminal. The procedure is identical with the one described, however, there is no need to put the sending terminal to group mode as the previous operations have already activated the group mode.

As physical presence within the new group creates a feeling of unity among common users, this feeling can be enhanced further by actually uniting the group of terminals, too. Physical contact can also be used to eliminate a group of user interface functions from the user thus making the grouping process straightforward and robust. Since communication between individual terminals can be arranged at much lower cost from both hardware and software point of view the option of physical contact can be preferred over the short distance wireless alternatives. The main drawback of physical contact based grouping is the difficulty of handling large groups, i.e. a stack of terminals may get difficult to handle without any support like a table. It will be understood that other solutions like physical contact, magnetic or other optical transmissions, contactless transmissions like radio, (e.g. Bluetooth terminal) which can be done e.g. within 10 m radius. Also voice recognition based solutions are possible, like using system as in Nokia's patent publication EP0959401 relating to voice browsing. The functions like forming a group, sending a message or listening to a message can be prerecorded and recognised by the terminal when these commands are uttered.

Figure 6:
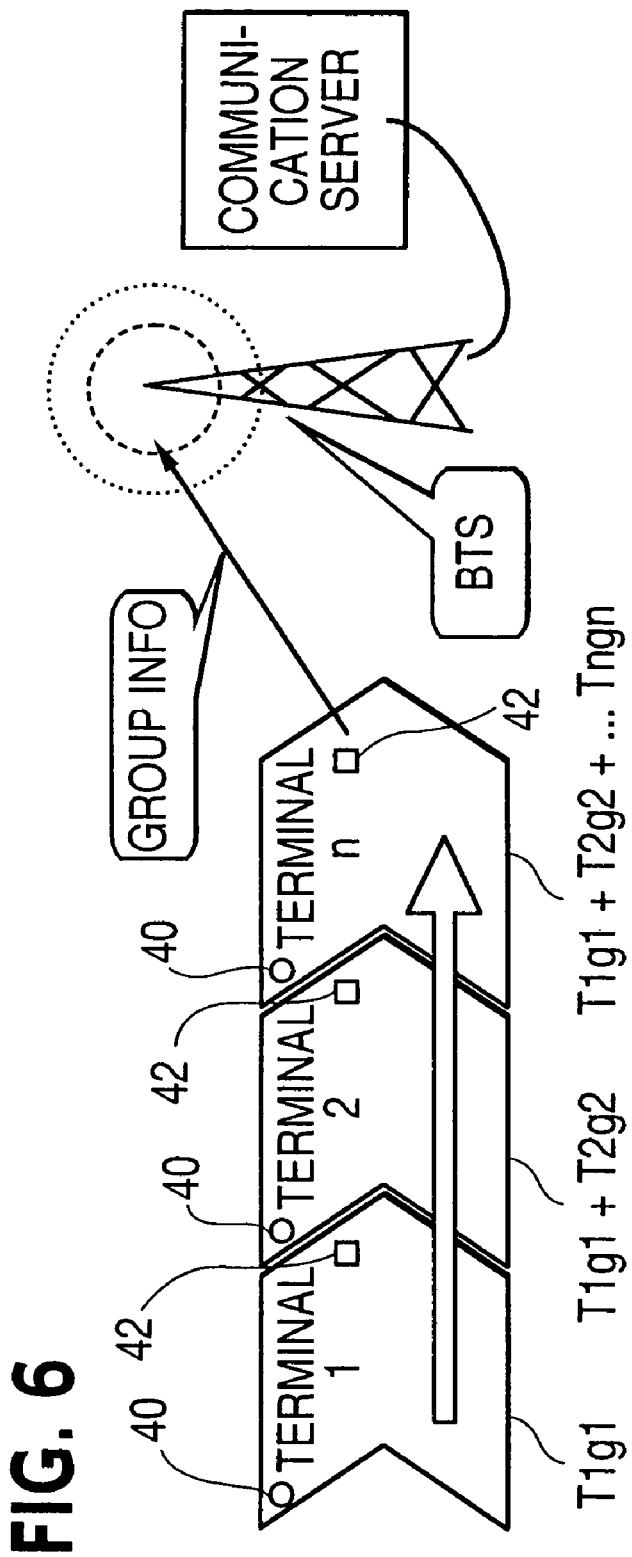
FIG. 6 illustrates the operating principle of physical contact based terminal grouping and the data flow within an array of terminals in group forming.
Figure 7:
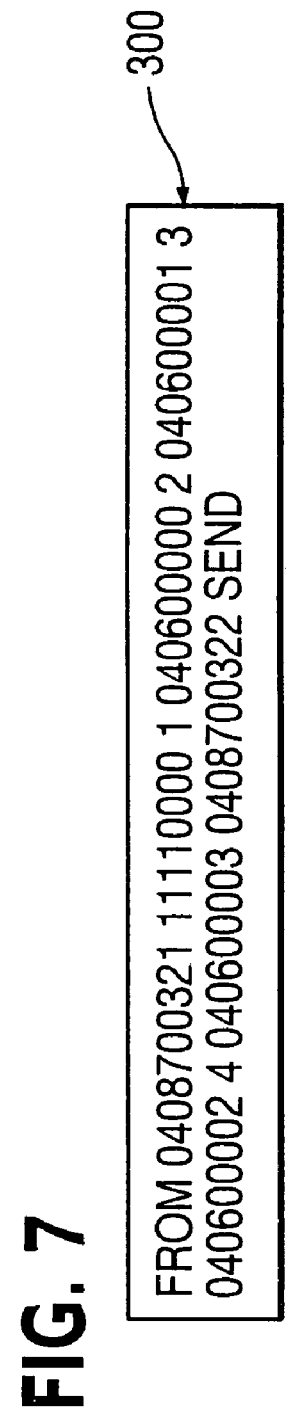
FIG. 7 illustrates a message example of the information sent to the communication server when forming a group.

FIG. 6 illustrates the operating principle of physical contact based terminal grouping. In this example a group of 2–n terminals is created. Terminal-1 and terminal-2 forward their identity to terminal-n, which then automatically communicates the newly built group structure to the communication server over the GSM network e.g. either by utilizing GPRS or SMS (Short Message Service). This action is implemented as self-explanatory as possible, hiding all protocol and GSM related complexities from the user. When GSM SMS is used, it sets limitations to the group size as well as lengths of various identifier codes and CRC. One example of a message 300 sent to the communication server in a specified number address could be as shown in FIG. 7 where the message has identifiers FORM and SEND between which the group shall be formed and then the information there are the information which can be seen in the table of the communication server as in FIG. 2.

Upon detecting the group forming state a terminal microcontroller (CPU) starts transmitting idle characters, i.e. "please standby" messages to the next terminal in line. This effectively creates a bi-directional data path (chain of sensors in one direction and idle data in the other) ensuring that the array remains intact during the grouping process. The first terminal in line requests its user to input the group selection. Once the selection has been given the terminal changes its local communication channel transmitter to send identity data rather at regular intervals.

FIG. 6 illustrates the data flow within an array of terminals when a group is being formed. The first terminal in the array, terminal 1 (known to be the first from the fact that it has been connected to a terminal at the front (sensor 42) but it is not receiving data from the back (magnet 40)) keeps transmitting its own identity code T1 (serial number, address and/or name) plus a reference to the logical group g1 (typically a button code, the communication server needs this data in order to later send messages assigned to this particular button, icon or text identifier shown in the terminal user interface) at regular intervals to the next terminal in the array, terminal 2. Terminal 2 adds its own identity T2 and group identifier g2 in the message body and forwards the combined data to terminal 3 and so on. The last terminal n (known to be last in the array by the fact that it is not connected at the front but it is still receiving valid data at the back) adds its own identifiers in the data string and contacts the communication server to officially form this new group (Group info in FIG. 6). The group may be named either automatically using the names of the equipment forming the group (e.g. name1+name2+ . . . name n) or the user of the terminals can name the group. In the latter case each terminal can then have an own name for the group (e.g. scouts, football).

An alternative way to form a group and when a communication link like Bluetooth is used as a local data transmission channel, the master of the group forming is selected amongst the terminals (when forming the group). When the voice messaging terminals are in the group forming mode e.g. a Bluetooth connection is selected from the menu of the display of the terminals who want to form the group and who are within the area of that radio. After a few seconds the master terminal (having a display) shows the names of the terminals that are to be connected in a list. The intention is that someone of the users checks if the list is correct). At the bottom of the list there are two rows (alternatives): cancel and accept. (An example of the display shown in FIGS. 11A, 11B and 11C for sending a message). By pressing the select button when the accept option is selected the group will be created. In order to communicate between the members of the group outside the range of the Bluetooth radio link (which has about a 10 m range) the information of the group is sent to the communication server.

A master terminal can be either voted by the terminals using an algorithm that is similar what is used in token buss type networks. Or the master can be selected by the location of the terminals. In this case e.g. the rightmost terminal (in FIG. 6 the one that detects another terminal nextby it on the left hand side, but not on the right hand side) is the master.

Although not shown the data frames need to be equipped with parity or CRC (Cyclic Redundancy Check) data in order to unwanted group members resulting in data transfer errors.

After receiving all group forming related data from the new group members terminal n prompts this with special sound, light or other user interface design enabled method. This is an indication to all users that the process is complete and the array may be broken. From this on terminal n alone continues the grouping process with communication to the communication server.

Group information may comprise a string of characters or binary data bytes containing the terminal identifier (typically serial number) and the local group identifier (typically one number or byte of data) of each group member, e.g. as shown in FIG. 7. A parity and/or CRC type checksum may be added to the message to ensure error free communication. The communication server confirms creation of a new messaging group by sending a "new group successfully created" message to each terminal belonging to the group. Users may start using the group after receiving the confirmation message.

Grouping can even be fully automatic procedure if terminal's can only do one group at a time. The situation is more complex, however, in most practical cases where the user is given the option of communicating voice messages with more than one group.

When a group of terminals are stacked in an array for group forming all associated users are expected to manually select the preferred group option in their individual terminals. In practice this can be handled by e.g. tapping a group button according to guidance given with indicators (typically LED's or text/graphic on a display). Voice control can also be used, if all terminals' are capable of identifying their owners. A terminal can detect presence of other similar terminals either through contact sensitive switches, galvanic contact, bi-directional communication channel polling or contactless sensing. FIG. 3 shows the magnetic field based contactless method. Use of magnet and sensor (e.g. reed relay, Hall detector) combination provides a reliable and yet ESD (Electro Static Discharge), dirt and water proof means for detection. As bonus one gets a comfortable snap-hold performance without creating too fragile mechanical locking structures in the terminal housing. This is an alternative for detecting somebody in the vicinity and allow automatic group formation mode.

An example of terminal local communication channel arrangement is presented where a communication channel as data transmission channel may be formed between the terminals e.g. in the situation shown in FIG. 6. The communication channel can be implemented as a single direction path providing that the following rules apply: all terminals are arranged in physically integral array, the last terminal in row (e.g. terminal nth in FIG. 6) gets the responsibility of communicating the group information with the communication server, and successful grouping is informed to each group member by the communication server. One straightforward way of implementing the low-level communication protocol is to use the UART commonly available in microcontrollers. Due to low amount of data being transferred the data rate need not be very high. Practical data transfer rate with commonly available low price components is in the area of 1200–19200 bps. There are several alternatives for implementing the physical communication layer: galvanic contact, capacitive coupling, inductive coupling, optical coupling.

Alternatives listed above have very different cost/performance/reliability implications. The galvanic contact is definitely the cheapest to implement, yet it is sensitive to dirt and water and ESD problems may eventually turn the cost performance upside down. Capacitive coupling is not very practical at low data rates required in terminal. Inductive coupling would be ideal for data rates used in the terminal, but unfortunately the number of components required for a reliable interface is beyond practical limits in a consumer electronics device. At short distances (<1 cm) optical interface (FIG. 8) is straightforward and suitable SMD (Surface Mount Device) components are readily available. Both visible or invisible (infrared) light sources may be used as data transmitters. The drawback with this is the terminal casing: transparent windows are needed, thus causing potential sealing problems.

Making a group with no one can erase all connections related to a button, i.e. in group forming mode the user presses the button for e.g. 3 s without another terminal with which to communicate. In info mode one can listen the status of the groups. Status may be checked in like the other messages in communication modes, i.e. by short button presses. Status information includes IDs of group members, number of new messages, time of last new message and so on. In addition this mode enables the user to delete all new messages without listening, reset the button. Prompts such as follows are given "Press the group button to delete all messages in this group" and "Press the group button to leave the group". The group-forming mode is exited, when the terminals are separated form each other.

The SMS including information about group and group member information may be sent from the terminal, which has the information of the other members of the new group, to the communication server. When establishing a connection between the voice messaging terminals the SMS message may be sent so that it automatically initiates transmission of a message through SMS, by establishing automatically a connection to the SMSC (SMSC=Short Message Service Center) and inputting information to SMS that initiates transmission of a message to messaging terminals through the SMS. The information sent in the messages may be as presented in FIG. 3.

A mobile originated short message transmission and a mobile terminated short message transmission are defined as different services. Short messages are transmitted from a mobile terminal to the short message center SMSC. These short messages may be directed to other mobile users or to subscribers of a fixed network. Short messages are transmitted from the short message center SMSC to terminals. These short messages may have entered the short message center SMSC from other mobile users or from other sources. The protocol used between the SMSC and the terminals is called SMTP (Short Message Transport Protocol). The short message center SMSC is given an ISDN number of its own in the numbering domain of the GSM network, and using this number the mobile terminal can direct a short message to the SMSC. Further in order to reach the said voice communication server, said number may be specific to the communication server or certain numbers of terminals may be directed to the voice messaging server services.

The short message service center SMSC is connected to the voice communication server so that it is possible to send messages to the voice communication server. The connection between the short message center SMSC and the communication server may be similar to that in the existing short message service centers.

The transmission and reception of short messages via the GSM connection are controlled by the SMSC which is connected to the communication server in the case SMS messages are preferred. The functionality of the SMSC is to convert a short message received via the GSM connection into the communication server. The communication server controls and fetches the members of the group by the identifier. The destination addresses are found from the list of the communication server as shown in FIG. 2 and short messages including the recorded and compressed voice message are sent to the group members of the mobile terminals via the GSM connection. The short message center further may comprise a database in which the messages are stored as well as different parameters, conversion tables, etc. needed by the control unit. When a mobile user wants to receive information from an communication server, he sends a short message, which is, directed (ISDN number) to the short message service center SMSC and includes an identifier, which directly or indirectly indicates the group and the key number in question. A direct indication includes the group id, and key number and mobile number, for instance.

The short message is transmitted to the short message center SMSC as a normal mobile originated message. It includes the numbers for identifying the group members as presented in 300 in FIG. 6 in case the group is wanted to be established by the GSM telephone or by the voice messaging terminal or conventional keypad for dialing digits. Having received the short message SMSC fetches the destination addresses from the table on the basis of the group identification code and the SMS has been sent to the destination addresses. The length of a short message is limited, e.g. to 160 characters. The messages longer than this can be sent—up to a certain limit—by chaining a few short messages one after another. The session control is supported by a database, which maintains information on the user's rights of service, terminal types, service profiles, etc. and on the services of closed groups (e.g. Centrex).

The communication server can be connected to the mobile communication network via standardized interfaces (telecommunications and signaling connections).

Figure 9:
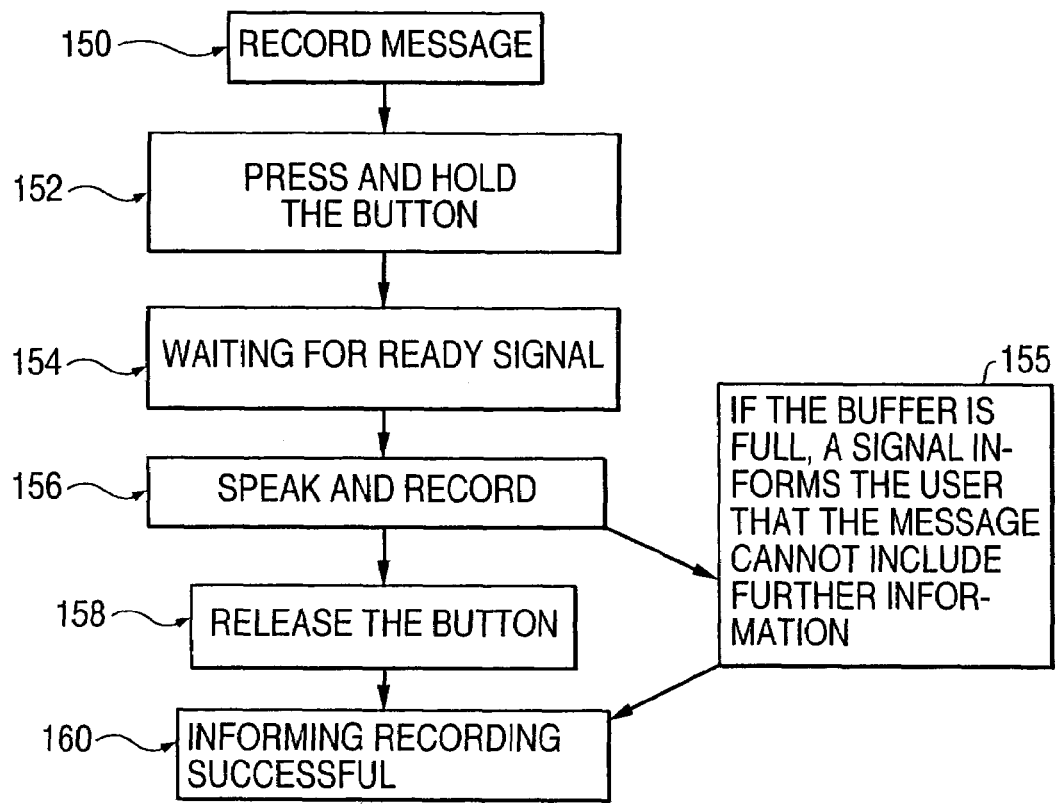
FIG. 9 shows a flow diagram showing sending of a message.

The voice messages between terminals of the same group is described in the following. The terminal records a voice message and sends it to the server. The message is listened when it is convenient for the receiver. FIG. 9 illustrates an alternative of a block diagram of sending a message between the members of an established group. The user having a simple voice messaging terminal in the first stage 150 presses and holds the key of the predetermined group. The terminal gives a signal that it is ready for recording in stage 152. It can be a single peep, by illumination or it can be said e.g. "speak now". The user speaks then in the stage 154. If the buffer is full in stage 155, the terminal gives a peep or says "full" in stage 156. Having spoken the message the user releases the key in stage 158 and the terminal will inform with a different or similar signal that recording is successful in stage 160. The message may be sent without the user needing to give any separate 'send' command. When the message reaches the server, it broadcasts the message to each member in the group. The length of the message to be recorded may be e.g. 30 s. The message can be sent also to the sender her/himself. However it might easier, if the sender-number and the destination numbers are compared and decided that if the numbers are the same the message will not be sent the sender. The voice messaging terminal is designed to enable communication within small functional groups of e.g. 2 to app. 10 people.

Figure 10:
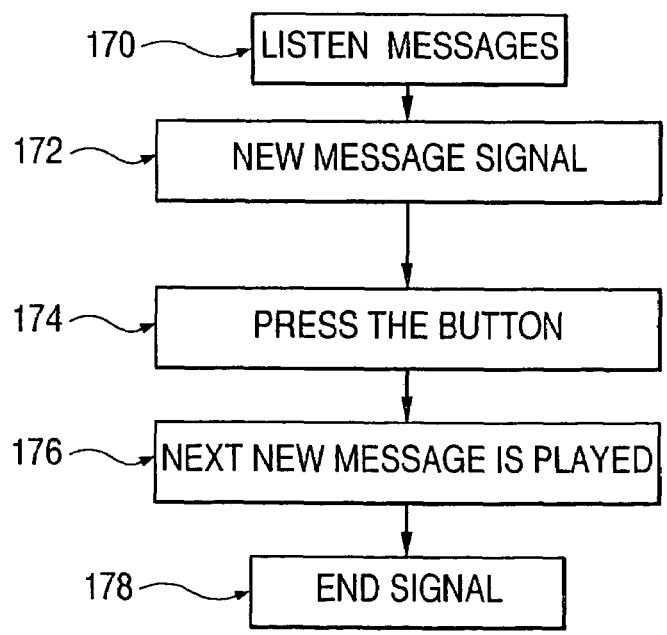
FIG. 10 shows a flow diagram showing sending of a message.

In the following FIG. 10 it is illustrated how the messages can be listened. A message to be listened is indicated e.g. by a blinking LED in the terminal and an alarm sound, if necessary. The user can at any moment listen to the next new message or repeat one previously listened message. When the voice messaging terminal informs that a message is received, the LED or other kind of lamp of the terminal usually closest to the key determining the group to the user is blinking or signal is given in steps 170, 172. In order to listen the message the user presses the respective button once in step 174. In next step 176 the terminal plays the message. After the message is played the end signal is given or blinking is stopped in step 178. A message signal may be different for different groups.

If pressed again while listening to a message, the rest of the message is skipped and the next message will be played. One previously listened message can be repeated. This feature is for being able to e.g. write down numbers or addresses. The message may be listened repeatedly. When the terminal is idle, the key is double pressed. The previously listened message is played. After listening end signal is heard.

The rate of LED blinking may indicate the number of new messages. The faster the rate, the more there are messages. The usage of the terminal may be such that when pressing once the key it is possible listen to a new or interrupt message, double pressing causes it possible to listen to a previous message or from start of a message. By holding the key pressed longer it is possible to record a message.

When somebody leaves the group a system message like "remove" message is sent. The server is contacted by the terminal and the register will be updated regarding that group. The group may be deleted automatically in the server, if there is less than 2 members. The last members are informed about this by a system message.

The server uses the group member information in delivering all messages to appropriate receivers.

A single communication server may be used with very different user groups (fun vs. work, children vs. elderly etc.) and, similarly terminals targeted for different customer segments may have very different industrial designs and user interface concepts. In order to manage this sort of versatility the group forming procedures, associated user interfaces and communication protocols need to be kept extremely simple.

Figure 11A:
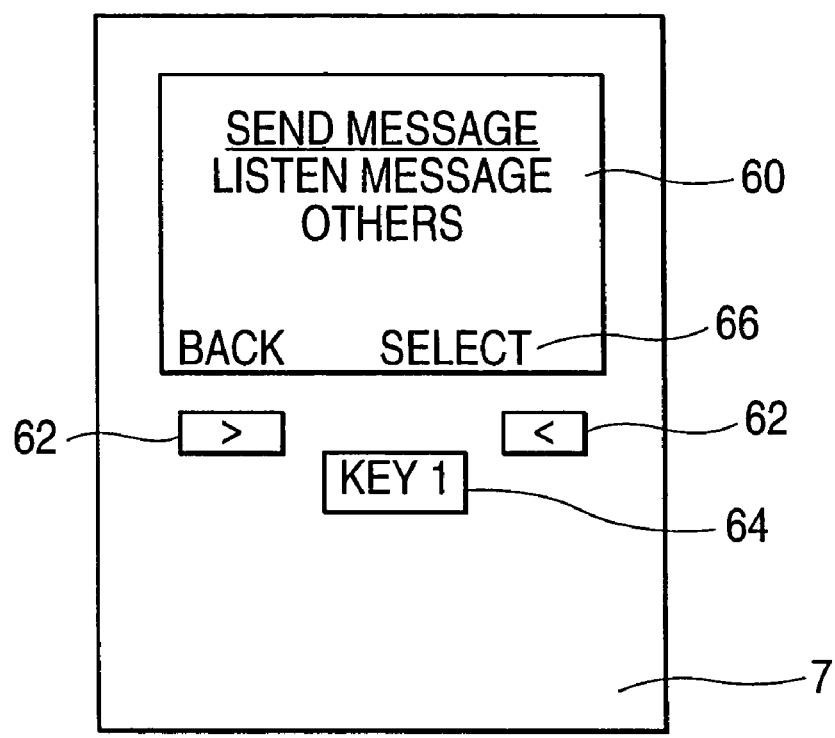
FIGS. 11A, 11B and 11C show example of the menu shown in the display when a message is recorded.
Figure 11B:
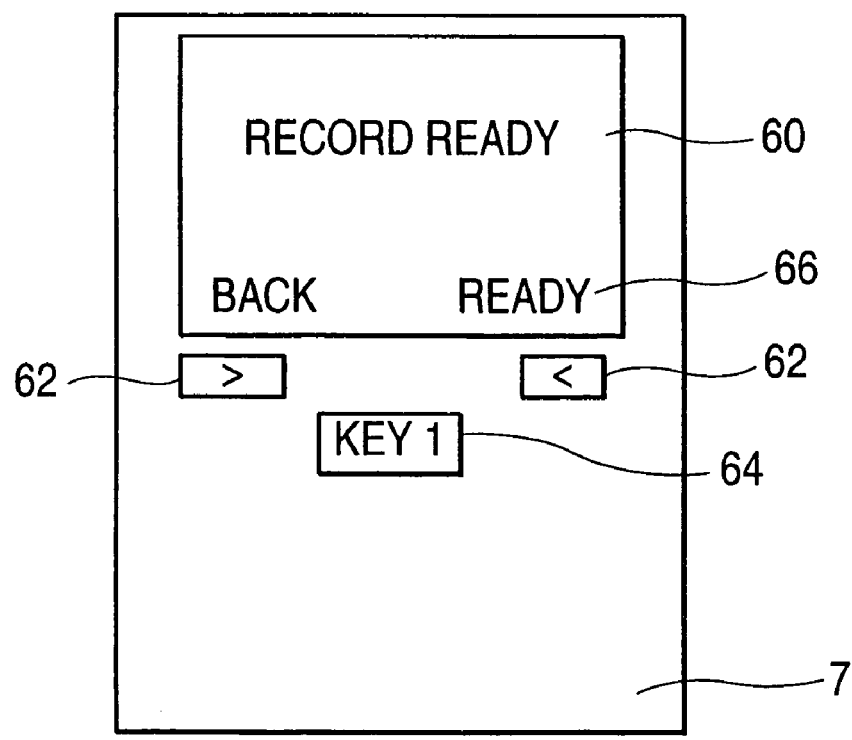
Figure 11C:
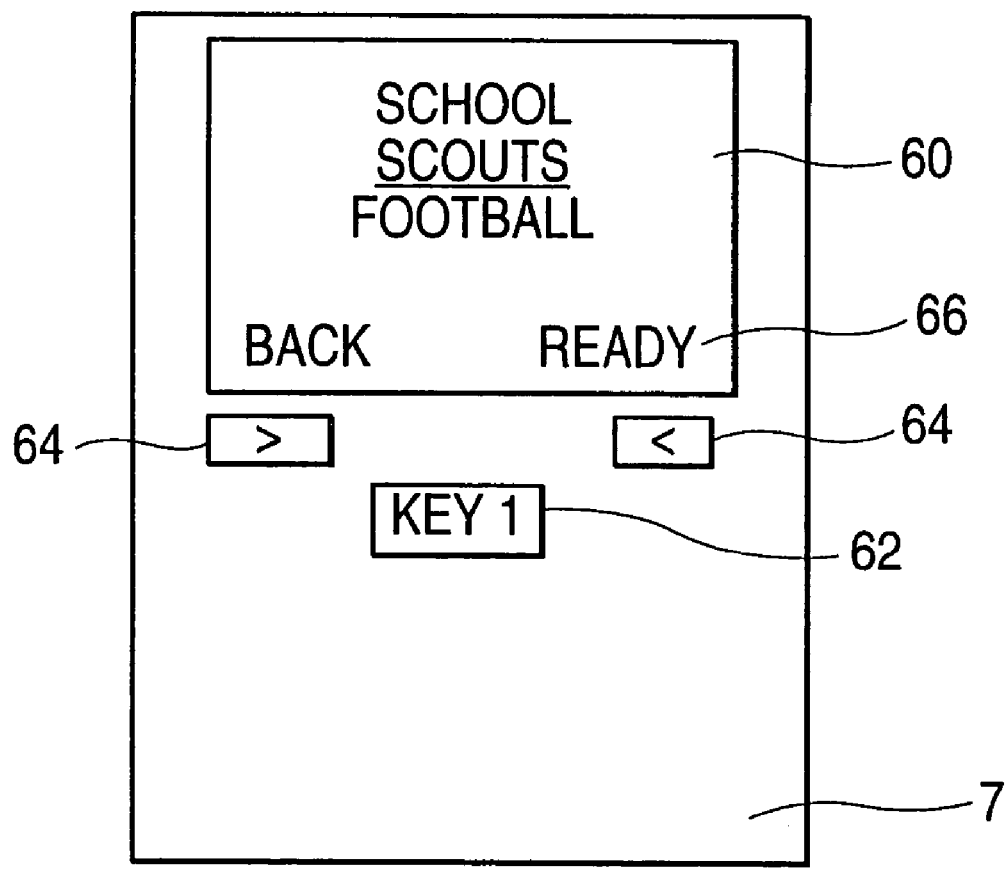

Despite using dedicated keys for every group it is possible to provide a solution as described below. This is preferred when the data transmission channel is radio, e.g. Bluetooth. Here is an example of an implementation of message sending using the aid of menus on the display of the voice messaging terminal. FIGS. 11A, 11B and 11C show schematically of menu selections in the display when the message is prepared for sending to the group. In the examples underlined text marks the selected row. User can scroll the menus and lists with the arrow keys. The Key 164 may be a Nokia NaviRoller type scroller key as in Nokia 7110 mobile terminal. The keys 62 show an example of keys which can help the moves in the menu selection. The display 60 contains the text information from which the user can select the functions like Select or Back 66. Other keys like on/off key are omitted from the Figure.

Main menu:
Send message
Listen message
Others
When "Send Message" is Selected in the List and the User Presses a Select Button, Recording Starts and Record Menu Appears:
Recording ready
When Recording is Done a List of Recipient Groups Appears.
School
Scouts
Football Pressing the select button now causes the terminal to send the recorded and compressed voice message to the selected group which in this is identified by the name of Scouts.

When a message arrives, an alert tone is given and the main menu option "Listen message" is activated. Pressing select button now starts the listening of the received message.

As such, and although the method and apparatus of the present invention has been illustrated and described with regard to presently preferred embodiments thereof, it will be understood that numerous modifications and substitutions may be made to the embodiments described, and that numerous other embodiments of the invention may be implemented, without departing from the spirit and scope of the invention as defined in the following claims. E.g. the stickers can be added to the keys to inform the group identity. The cover of terminal can be changed.

The invention claimed is:

1. A method for establishing a group of mobile terminals comprising:
coupling together mobile terminals by placing the terminals in close proximity to each other;
initiating a group creation command from at least one of said terminals by provoking information including an identification code of the at least one of said terminals and a reference to the group to a next terminal in a sequence of one group of terminals by a coupling comprising at least one of physical contact, magnetic coupling, inductive coupling and capacitive coupling;
adding, at said next terminal, to the information received from a preceding terminal an identification code of the next terminal and repeating the addition of an identification code of a next terminal to the information until a last terminal of the sequence of terminals receives the information;
collecting all information at said last terminal into group information and
providing said group information to all other terminals of the group.

2. A method as claimed in claim 1, comprising:
coupling together the mobile terminals by gathering together the terminals within a direct communication distance; and
detecting at each of said terminals that each of said terminals are able to form the group before initiating said group creation command.

3. A method as claimed in claim 1, comprising transmitting said group information from one of said terminals of the group to a communication server connected to a telecommunication network.

4. A method as claimed in claim 1, wherein the mobile terminals are mobile radio terminals.

5. A method as claimed in claim 1, comprising upon detecting a state of forming a group:
transmitting idle character messages from terminal to terminal in a sequence;
creating a bi-directional data path between at least two consecutive terminals; and
causing each terminal to request a user to input a group creation mode; and
upon receiving said input causing each terminal to send an identification to at least one of the terminals within the bi-directional data path.

6. A method as claimed in claim 5, wherein said input is done by pressing a key on each terminal.

7. A method as claimed in claim 6, wherein said key relates to the group.

8. The method according to claim 1, wherein light sources are used as data transmitters.

9. The method according to claim 1, wherein each mobile terminal comprises one dedicated illuminated button for each communication group.

10. The method according to claim 9, wherein stickers are added to each dedicated illuminated button identifying the communication group.

* * * * *

UNITED STATES PATENT AND TRADEMARK OFFICE
CERTIFICATE OF CORRECTION

PATENT NO.         : 7,046,993 B2
APPLICATION NO.    : 10/853214
DATED              : May 16, 2006
INVENTOR(S)        : Ville Haaramo et al.

It is certified that error appears in the above-identified patent and that said Letters Patent is hereby corrected as shown below:

On Title Page Item (30) Foreign Application Priority Data section (30):
    Please insert: --Nov. 18, 1998   (FI)    982490--

In Column 14, Claim 1, Line 11:
    Please replace "provoking" with --providing--

Signed and Sealed this

Twenty-eighth Day of November, 2006

JON W. DUDAS
*Director of the United States Patent and Trademark Office*